United States Patent [19]
Stephany et al.

[11] Patent Number: 5,177,475
[45] Date of Patent: Jan. 5, 1993

[54] CONTROL OF LIQUID CRYSTAL DEVICES

[75] Inventors: Joseph F. Stephany, Williamson; Joseph J. Wysocki, Webster, both of N.Y.; Sui K. Hark, Shatin, Hong Kong; Virgil J. Hull, Perinton, N.Y.

[73] Assignee: Xerox Corporation, Stamford, Conn.

[21] Appl. No.: 630,205

[22] Filed: Dec. 19, 1990

[51] Int. Cl.⁵ .............................................. G09G 3/36
[52] U.S. Cl. .................................. 340/784; 340/719; 359/54
[58] Field of Search .................... 340/784, 719; 350/350 S, 339 R, 332, 331 R, 333, 347 R; 359/54, 74, 48, 56, 94

[56] References Cited

U.S. PATENT DOCUMENTS

| | | | |
|---|---|---|---|
| 4,212,010 | 7/1980 | Walter | 340/784 |
| 4,295,137 | 10/1981 | Haugsjaa | 340/781 |
| 4,367,924 | 1/1983 | Clark et al. | 350/334 |
| 4,386,352 | 5/1983 | Nonomura et al. | 340/784 |
| 4,586,039 | 4/1986 | Nonomura et al. | 340/784 |
| 4,595,259 | 6/1986 | Perregaux | 350/331 R |
| 4,728,172 | 3/1988 | Cannella | 350/332 |
| 4,728,174 | 3/1988 | Grinberg et al. | 350/334 |
| 4,728,175 | 3/1988 | Baron | 350/336 |
| 4,738,515 | 4/1988 | Okada et al. | 350/350 R |
| 4,759,610 | 7/1988 | Yanagisawa | 350/334 |
| 4,779,958 | 10/1988 | Kato et al. | 350/341 |
| 4,783,146 | 11/1988 | Stephany et al. | 350/331 R |
| 4,796,979 | 1/1989 | Tsuboyama | 350/350 S |
| 4,840,460 | 6/1989 | Bernot et al. | 350/333 |
| 4,902,107 | 2/1990 | Tsuboyama | 350/350 S |

FOREIGN PATENT DOCUMENTS 282300A 9/1988 European Pat. Off. .

OTHER PUBLICATIONS

Elasticity and Order of Nematic Liquid Crystals by Frans Leenhouts (Dec. 14, 1979) pp. 37 and 38.

Primary Examiner—Ulysses Weldon
Assistant Examiner—Regina Liang
Attorney, Agent, or Firm—Oliff & Berridge

[57] ABSTRACT

Liquid crystal devices are provided with a DC current blocking layer which improves the lifetime of the liquid crystal device and also permits the use of two-level drivers, thus reducing the complexity of the driving scheme necessary to address the liquid crystal devices. Preferably, the blocking layer is the alignment layer which is made from poly-para-xylylene having a thickness sufficient to act as a DC blocking layer. Additionally, specific driving schemes for driving liquid crystal devices are provided. When the liquid crystal device includes a material which relaxes when no voltage is applied thereto (e.g., a nematic material), the information signal is entirely removed from alternating time frames during which the liquid crystal device is addressed. When the liquid crystal device includes a ferroelectric material, an arbitrarily large voltage potential is applied to the electrodes located on one side of the ferroelectric material for a first portion of a dwell time so that the pixels of the liquid crystal device are easily cleared of any previous information.

13 Claims, 6 Drawing Sheets

PRIOR ART

CONTROL OF LIQUID CRYSTAL DEVICES

BACKGROUND OF THE INVENTION

1. Field of the Invention

The present invention relates to liquid crystal devices, and in particular, to liquid crystal devices having alignment layers which also serve to block the DC component of a signal applied thereto and to controls for supplying signals to such liquid crystal devices.

2. Description of Related Art

Light shutters are devices which can be controlled to selectively block or permit the transmission of light therethrough. Light shutters have numerous applications. For example, a single light shutter can be used in systems which transmit data optically to permit or prevent the transmission of optical signals therethrough much like an electrical switching device is used in systems which transmit data electrically. A linear array or a matrix of light shutters can be arranged between a light source and a photosensitive material such as, for example, a photoconductive drum or a belt, in an image producing machine such as a copier, printer, or facsimile machine. As the photosensitive material moves past the array or matrix of light shutters, the light shutters are selectively actuated to block or permit the transmission of light from the light source to the photosensitive material to form a latent image on the photosensitive material. This latent image is, for example, toner developed and then transferred to a sheet of paper or other material to form a permanent image on the sheet.

A matrix of light shutters is also typically used to form a display or display screen wherein the light shutters are selectively actuated to form images on the display screen by controlling the transmission of light through portions of the display screen or by controlling the reflection of light by a surface located behind the display screen. Other uses of light shutters are known and possible and are intended to be covered by the present invention. For example, it is known to use liquid crystal display devices as light shutters in copiers, printers, or the like. See, for example, Xerox Corp. U.S. Pat. Nos. 4,506,956, 4,527,864, and 4,475,806.

Liquid crystals are commonly used to form light shutters. Liquid crystals are well known and, generally, are made from materials which exhibit more than one refractive index depending upon their orientation, and whose orientation can be changed by the application of an electric potential.

In a typical transmissive type liquid crystal device, a thin layer of liquid crystal material is sandwiched between parallel, transparent glass substrates bearing transparent, patterned electrodes on their inner confronting surfaces. At least one polarizer is located on the outer surface of one of the glass substrates and a light source spaced from the device directs light therethrough. By selectively supplying an electric field across the layer of liquid crystal material by means of selectively applying, for example, an AC voltage to the electrodes (for nematic-type liquid crystals), the transmissivity of the light through the liquid crystal device may be changed for passing or blocking light in accordance with the electrodes addressed by the voltage.

Liquid crystal materials are organic substances made up of rod-like molecules that are typically about 10 Å long and several Å thick. Within certain temperature ranges, these materials exhibit optical properties of an ordered crystal but have flow properties of liquid.

In the nematic-type of liquid crystal material, which is used with one aspect of the present invention, the center of gravity of the molecules is unordered and random, as in the case of isotropic liquids, but the molecules tend to align themselves with their axis parallel.

Since the individual liquid crystal molecules have an elongated shape and dipoles (both permanent and induced) which are direction dependent, films of these materials exhibit anisotropy in their dielectric constant and refractive index. Materials that exhibit a positive dielectric anisotropy have molecules that tend to align themselves parallel to an applied electric field, while the molecules of materials that exhibit a negative dielectric anisotropy tend to align themselves perpendicular to the field. Because of their optical anisotropy, a change in the orientation of the liquid crystal molecules by an electric field can cause a change in optical transmission when used in conjunction with light polarizing sheets.

By suitable treatment of the inner glass substrates, nematic liquid crystal materials which have a positive dielectric anisotropy are caused to align in a particular direction parallel to the glass substrate surfaces. In one method, the glass substrates may be coated with a thin organic film and conditioned by, for example, rubbing with a lint-free cotton twill cloth in a unidirectional manner. Fine grooves about 50 Å wide are formed causing the liquid crystal molecules to lie substantially parallel to these furrows since this results in a low energy state. Such a conditioned film is generally called an alignment layer or film.

During fabrication the two glass plates are oriented with their alignment directions parallel to each other. A typical transmissive, liquid crystal device that uses a nematic liquid crystal material with a positive dielectric anisotropy comprises two parallel, transparent glass substrates having one or more transparent electrodes (known as pixel electrodes) on the inner surface of one of the glass substrates with at least one electrode on the inner surface of the second glass substrate (known as a backplane electrode) that is opposed to the pixel electrodes on the inner surface of the first glass substrate. A transparent alignment layer covers the pixel and backplane electrodes so that the molecules of the liquid crystal material placed between the glass substrates are parallel to the glass substrate surfaces while they are in their stable relaxed state (with no voltage, or a voltage below a threshold voltage applied). When a voltage above a threshold voltage is applied to the electrodes, the molecules orient themselves perpendicular to the glass substrates and parallel to the direction of the electric field. A polarizer placed on the outside surface of one of the glass substrates, allows the light vector of one direction to pass therethrough but blocks all other light vectors.

When the liquid crystal molecules are lying parallel to the glass substrates in their relaxed state, due to their birefringence, they convert the linearly polarized light passed by one polarizer into elliptically polarized light. Once a voltage is applied to the electrodes, the molecules rotate by 90° to align themselves parallel to the electric field and perpendicular to the glass substrates. This is the electrically driven stable state (or ON state), and in this arrangement, it does not affect the state of polarization of light that travels in a direction essentially perpendicular to the glass substrates. If two polarizers are used on either side of the device, their transmission axes can be either parallel or crossed depending on whether it is desirable that the driven state be clear or dark respectively.

Typically, each pixel electrode is addressed by a thin film transistor (TFT) which acts as a switching device to permit a voltage potential to be applied to each pixel electrode. See, for example, U.S. Pat. No. 4,783,146 to Stephany et al (Xerox Corporation), the disclosure of which is herein incorporated by reference.

It is also known to use ferroelectric materials to form liquid crystals. See U.S. Pat. No. 4,367,924 to Clark and Lagerwall, the disclosure of which is herein incorporated by reference. The ferroelectric liquid crystal in a suitably prepared device has bistability, i.e., has two stable states comprising a first optically stable state (first orientation state) and a second optically stable state (second orientation state), with respect to an electric field applied thereto. Accordingly, the liquid crystal is oriented to the first optically stable state in response to one electric field vector and to the second optically stable state in response to a reversed electric field vector. Further, this type of liquid crystal very quickly assumes either one of the above-mentioned two stable states in response to the direction of an electric field applied thereto and retains such state in the absence of an electric field.

Thus, ferroelectric liquid crystals are polarity sensitive. In any device in which they are used, their response depends upon the sign of the applied voltage as well as upon its magnitude.

While separate pixel electrodes can be supplied for each liquid crystal shutter in an array or matrix of shutters along with corresponding TFT's for each pixel electrode for ferroelectric liquid crystal devices (as with nematic-type devices mentioned above), it is also possible to use an address scheme wherein a first array of parallel electrodes is laid over a second array of parallel electrodes, the arrays being perpendicular to each other, whereby intersections of the electrodes of each array defines each liquid crystal pixel. See, for example, U.S. Pat. No. 4,367,924 to Lagerwall et al, FIG. 2. In this arrangement, the first array of parallel electrodes are located on one glass substrate and the second array of parallel electrodes which are perpendicular to the electrodes in the first array are located on a second substrate, with the ferroelectric material sandwiched therebetween. The electrodes are selectively supplied with voltages so that selected liquid crystal pixels are turned "ON" or "OFF".

An advantage of the electrode layout using two perpendicular arrays of parallel electrodes over the TFT layout is that TFT's may have a low yield and are much more costly to manufacture. That is, TFT's are more difficult to manufacture and, should one TFT in a matrix of TFT's be defective, the entire matrix may need to be replaced, further increasing their costs. Advantages of TFT's are that they have a precise threshold voltage over which they will be turned "ON" and under which they will be switched "OFF". Additionally, when using two perpendicular arrays of electrodes, pixels which are not desired to be switched "ON" can be slightly actuated due to the small voltage applied thereto when other pixels sharing one of its electrodes are switched "ON". This slight switching "ON" reduces the contrast achievable with these devices.

Figure 1:
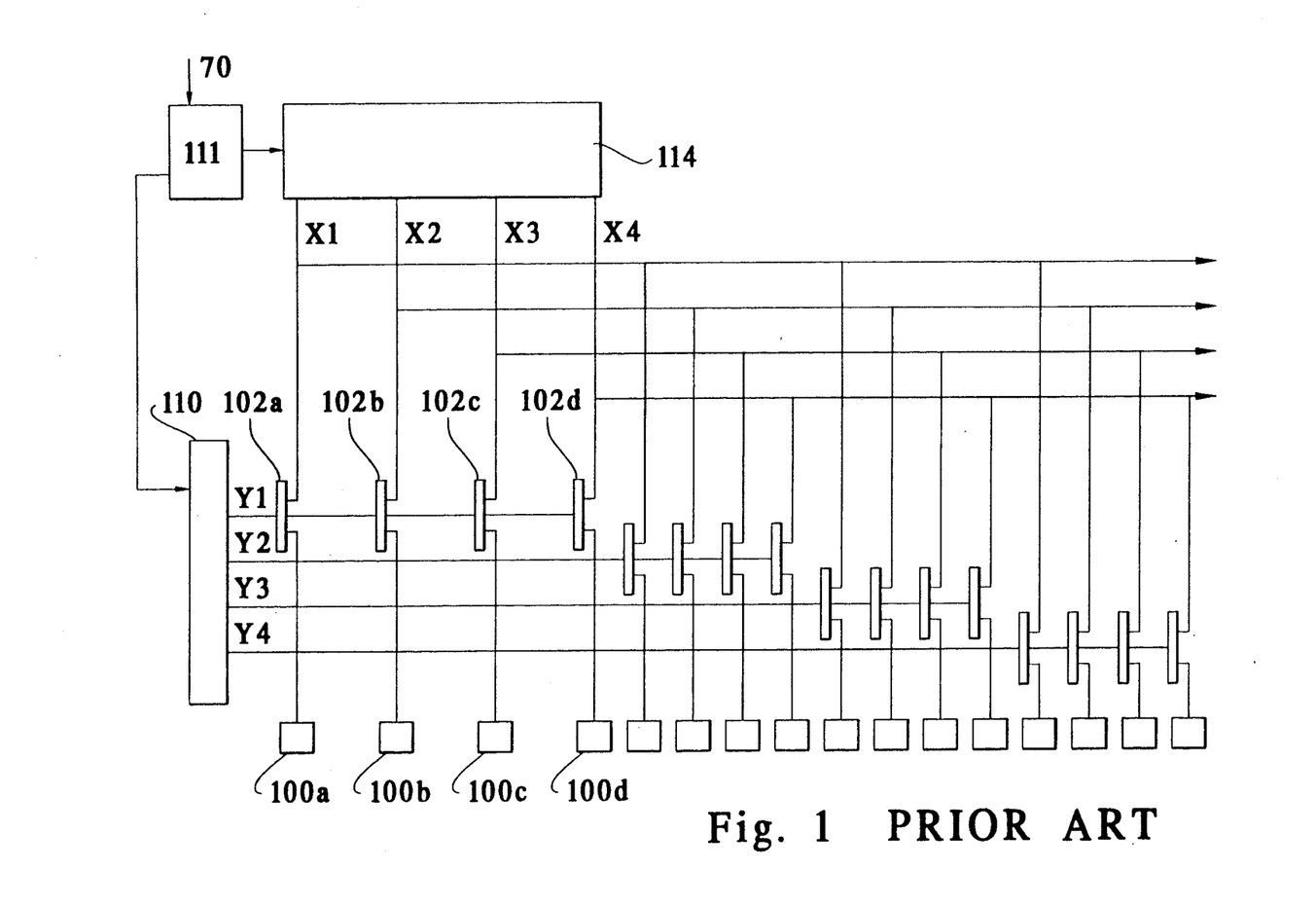
FIG. 1 is a plan view showing circuitry for addressing an extended array of pixel electrodes with an array of TFT's.

Conventionally, nematic type TFT addressed liquid crystal displays such as shown in the above-incorporated U.S. Pat. No. 4,783,146, were addressed with three voltage level drivers on the data or X-axis, while applying two-voltage level drivers on the strobe or Y-axis. For example, FIG. 1 shows an array of pixel electrodes $100a$–$100c$, each connected to a respective TFT $102a$–$102c$. Each TFT acts as a switching means and is switched ON or OFF based upon the voltage applied thereto from controller 110 through strobe lines $Y_1$–$Y_4$. Each strobe line $Y_1$–$Y_4$ is attached to a gate of a group of TFT's. For example, in FIG. 1, strobe line $Y_1$ is attached to four TFT's so as to control the state (ON or OFF) of TFT's $102a$–$102d$ and, consequently, control electrodes $100a$–$100d$. The actual voltage applied to each pixel electrode is supplied by three-level driver 114 through data lines $X_1$–$X_4$. Each data line $X_1$–$X_4$ addresses a single TFT in each group of four TFT's. Thus, each pixel electrode can be selectively addressed by applying an appropriate voltage thereto through data lines $X_1$–$X_4$ when the group of TFT's associated with the pixel electrode is switched ON by the appropriate strobe line. This address scheme is generally well known as shown in the above-incorporated U.S. Pat. No. 4,783,146.

Figure 2A:
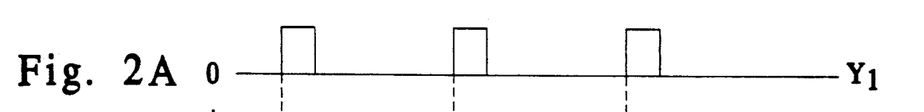
FIGS. 2A–2C illustrate timing waveforms previously applied to the X- and Y-axes for a liquid crystal device employing TFT's and the voltage waveform which results across a nematic liquid crystal material.
Figure 2B:
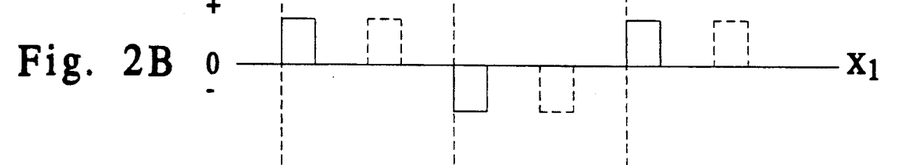
Figure 2C:
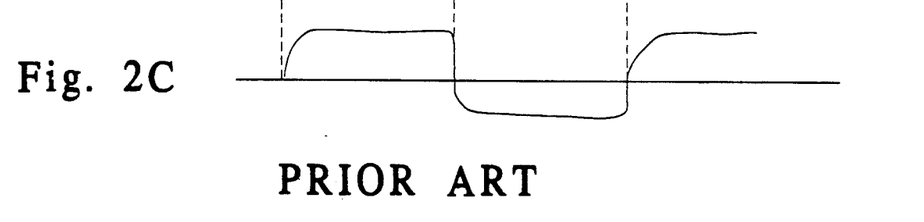

FIG. 2A illustrates the Y-axis waveform (which has two levels), wherein a pulse which switches the TFT's attached to strobe line $Y_1$ ON is applied to strobe line $Y_1$ at the beginning of each frame. A frame is a time period during which all of the pixels in the device (image bar, display, etc.) are supplied with an information signal which switches each pixel ON or OFF once (much like a frame of a movie film). Accordingly, within one frame time period, each strobe line $Y_1$–$Y_4$ will receive an ON pulse, usually with each strobe line receiving an ON signal one at a time. FIG. 2B shows the three voltage levels applied by driver 114 to the data lines. In particular, a pulse for applying a voltage above a threshold voltage to data line $X_1$ for electrode $100a$ and TFT $102a$ in three consecutive frames is shown in solid lines, while a similar pulse for data line $X_1$ for a TFT associated with strobe line $Y_3$ is shown in broken lines. FIG. 2C shows the resulting voltage applied across the liquid crystal throughout each line frame. The reason why three voltage levels are applied to the X-axis data lines is that it is necessary to apply an alternating current to the liquid crystal to avoid electrochemical degradation as well as to prevent saturation of optical properties. The AC signal results in the RMS (root-mean-square) voltage applied to the liquid crystal being equal to zero over time.

Figure 3:
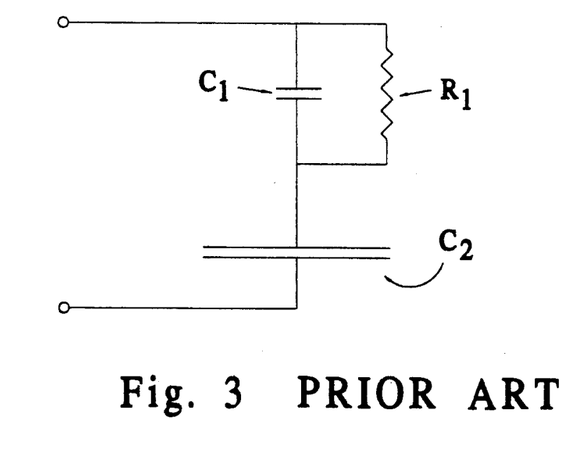
FIG. 3 is an electrical analog of a blocking layer/liquid crystal system.

It has been found that the placement of a DC current blocking layer adjacent the pixel electrodes blocks the DC component of the applied voltage and thus permits two voltage level drivers to be used on the data lines. See the above-incorporated U.S. Pat. No. 4,783,146 at column 4, lines 37-40. This may be more clearly understood by reference to FIG. 3, which is the electrical analog of the blocking layer/liquid crystal system. In these systems, the resistivity of the blocking layer is much higher than the resistivity of the liquid crystal layer $R_1$. Therefore, the resistivity of the blocking layer may be neglected. $C_1$ and $C_2$ represent the capacitance of the liquid crystal and blocking layers, respectively. As a result, the application of a signal to the liquid crystal which contains an average DC component, causes the blocking layer to charge to the average value of the applied wave, thereby automatically removing the DC component of the liquid crystal. It is therefore possible to apply an unbalanced voltage to the elements of the display without exposing the liquid crystal material to a DC current. This could allow the reduction in the cost of drivers and complexity of circuitry by eliminating the necessity of having three voltage-level drivers.

Figure 4A:
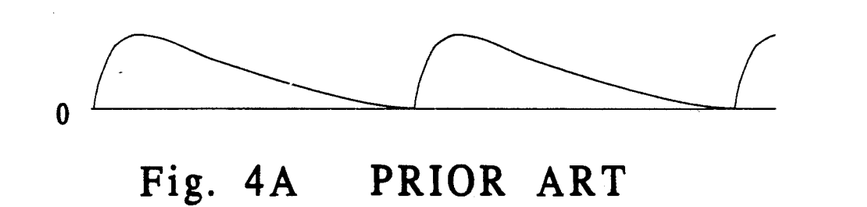
FIGS. 4A and 4B illustrate the timing waveform applied to a nematic liquid crystal device and the voltage across the nematic liquid crystal device in previous devices having no blocking layer.
Figure 4B:
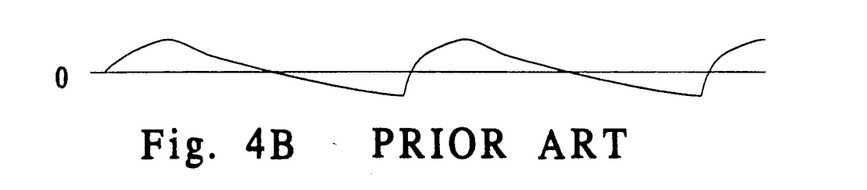
Figure 5A:
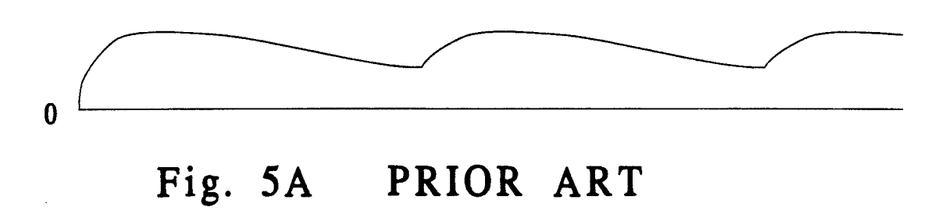
FIGS. 5A and 5B illustrate a timing waveform applied to a nematic liquid crystal device and the voltage across that device according to the prior art if a blocking layer exists.
Figure 5B:
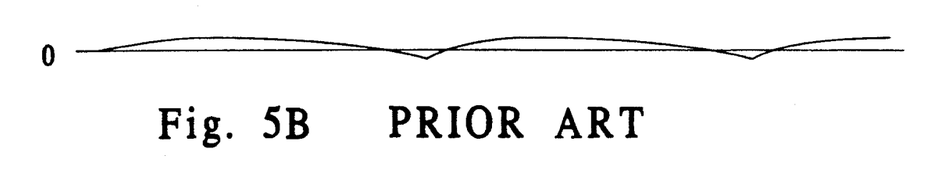

However, in attempting to eliminate the three-voltage-level drivers, another problem occurs. Assume that the voltage waveform shown in FIG. 4A is applied to the liquid crystal blocking layer. The resultant waveform across the liquid crystal is shown in FIG. 4B, where it is assumed that there is sufficient current leakage either in the liquid crystal or the TFT providing the applied voltage to discharge the liquid crystal in about one cycle or one frame time (i.e., before another data signal—for the next line of information—is supplied to the pixel electrodes in an image bar or display). However, if the leakage is less (for example, driving with better TFT's or a liquid crystal material that conducts less) and, as a consequence, the liquid crystal layer discharges only partly in one frame time, a problem arises. The resultant AC waveform applied to the liquid crystal blocking layer is shown in FIG. 5A and the voltage to the liquid crystal is shown in FIG. 5B. Since the liquid crystal responds to the RMS (root-mean-square) voltage applied to it, the reduction of leakage has had a profound effect in reducing the RMS on the liquid crystal and thereby also reducing the contrast achievable in the display. Thus, reducing the leakage (an achievement which is otherwise desirable because it allows for more precise control and less deterioration of the liquid crystal) causes decreased performance in the display. Although it is possible to require controlled leakage to prevent this loss of RMS, this solution is unsatisfactory because it requires the close control of leakage parameters in the device, a difficult task considering the difficulty of making TFT's and selecting liquid crystal material with specified amounts of leakage.

As discussed above, ferroelectric liquid crystal materials which are bistable are also used to form light shutters. Ferroelectric liquid crystals have exceptionally high speed as compared with other liquid crystal devices. Because of the bistability and the fact that no direct current can be allowed to flow through the liquid crystal cell without deteriorating it, Lagerwall et al (see Lagerwall et al, 1985 International Display Research Conference, p. 213) has proposed a system in which five different voltages are needed to be applied to the liquid crystal during one access or dwell time (one frame), and drivers capable of delivering four different voltage levels are needed. The difficulty with this procedure is that the time for access to align the ferroelectric liquid crystal is reduced by the necessity to apply certain pulses that are only needed to average the voltage across each pixel to zero. Because of the bistability of the ferroelectric liquid crystal, it is impossible to average the direct current component over more than one frame (i.e., to apply an AC waveform to average the DC component) because of the bipolar nature of the liquid crystal. For example, if one were to apply reverse voltages on alternate cycles, the display would have alternately positive and negative images which would result in a display with little or no contrast in the image presented. An ordinary liquid crystal would only have positive images despite the reverse polarity since ordinary liquid crystals are not bistable and are polarity insensitive.

U.S. Pat. No. 4,783,146 to Stephany et al discloses the use of DC current blocking layers in nematic liquid crystal devices. The use of DC blocking layers permits two-level drivers to be used. See col. 4, lines 37–40. Timing signal waveforms are shown in FIGS. 5 and 8.

U.S. Pat. No. 4,595,259 to Perregaux shows nematic liquid crystal devices used in an image bar.

EP 282,300A discloses a nematic liquid crystal device used as a color display.

A paper entitled "Elasticity and Order of Nematic Liquid Crystals" by Frans Leenhouts, published Dec. 14, 1979 appears to disclose the use of a polymer film of p-xylylene as an alignment layer in nematic-type liquid crystal devices.

U.S. Pat. No. 4,779,958 to Kato et al discloses shielding light sensitive TFT's and extending storage time by providing an opaque overlayer insulated from the TFT's, extending this overlayer and insulator, and combining the extension with an opposing conductor to form a storage capacitor.

U.S. Pat. No. 4,738,515 to Okada et al discloses a driving method for a ferroelectric liquid crystal device wherein a dielectric layer (which is also an alignment layer) is formed over the electrodes of the liquid crystal to prevent shorting. This layer also prevents a reversal phenomenon. See col. 7, lines 1–44.

Other patents disclosing the use of capacitance layers in liquid crystal devices include U.S. Pat. No. 4,728,172 to Cannella, U.S. Pat. No. 4,728,174 to Grinberg et al, U.S. Pat. No. 4,728,175 to Baron, and U.S. Pat. No. 4,840,460 to Bernot et al.

U.S. Pat. No. 4,759,610 to Yanagisawa discloses a liquid crystal device having a light shielding layer which covers the TFT's.

U.S. Pat. No. 4,212,010 to Walter discloses control of a bistable liquid crystal display.

U.S. Pat. No. 4,295,137 to Haugsjaa discloses an AC address signal whose voltage averages to zero.

U.S. Pat. Nos. 4,386,352 and 4,586,039 both to Nonomura et al, disclose the use of waveforms which must average zero DC.

As further background regarding methods of driving liquid crystals and ferroelectric liquid crystals, see U.S. Pat. No. Re. 33,120 and U.S. Pat. No. 4,769,659. All patents cited in this specification are herein incorporated by reference.

OBJECTS AND SUMMARY OF THE INVENTION

It is an object of the present invention to provide an improved blocking layer, which is also used as an alignment layer in a liquid crystal device.

It is another object of the present invention to prevent adverse DC effects on liquid crystals.

It is another object of the present invention to provide a more simple driving scheme for liquid crystal devices which are made from nematic as well as ferroelectric materials.

It is another object of the present invention to provide liquid crystal devices with increased contrast.

It is a further object of the present invention to increase the speed at which ferroelectric liquid crystals can be addressed.

To achieve the foregoing and other objects, and to overcome the shortcomings discussed above, liquid crystal devices are provided with a DC current blocking layer which improves the lifetime of the liquid crystal device and also permits the use of two-level drivers, thus reducing the complexity of the driving scheme necessary to address the liquid crystal devices. Preferably, the blocking layer is the alignment layer which is made from poly-para-xylylene having a thickness sufficient to act as a DC blocking layer.

Additionally, specific driving schemes for driving liquid crystal devices are provided. When the liquid crystal device includes a material which relaxes when no voltage is applied thereto (e.g., a nematic material), the information signal is entirely removed from alternating time frames during which the liquid crystal device is addressed. When the liquid crystal device includes a ferroelectric material, an arbitrarily large voltage potential is applied to the electrodes located on one side of the ferroelectric material for a first portion of each time frame so that the pixels of the liquid crystal device are easily cleared of any previous information.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

The present invention generally involves the use of an alignment layer, such as poly-para-xylylene having a thickness sufficient to act as a DC current blocking layer in liquid crystal devices. Preferred electrode addressing schemes are also provided when an adequate blocking layer such as, for example, poly-para-xylylene is used in nematic and ferroelectric liquid crystal devices. Accordingly, while one specific use of the present invention in an electrophotographic printer is shown, the present invention is applicable to any type of device which uses liquid crystals.

Figure 6:
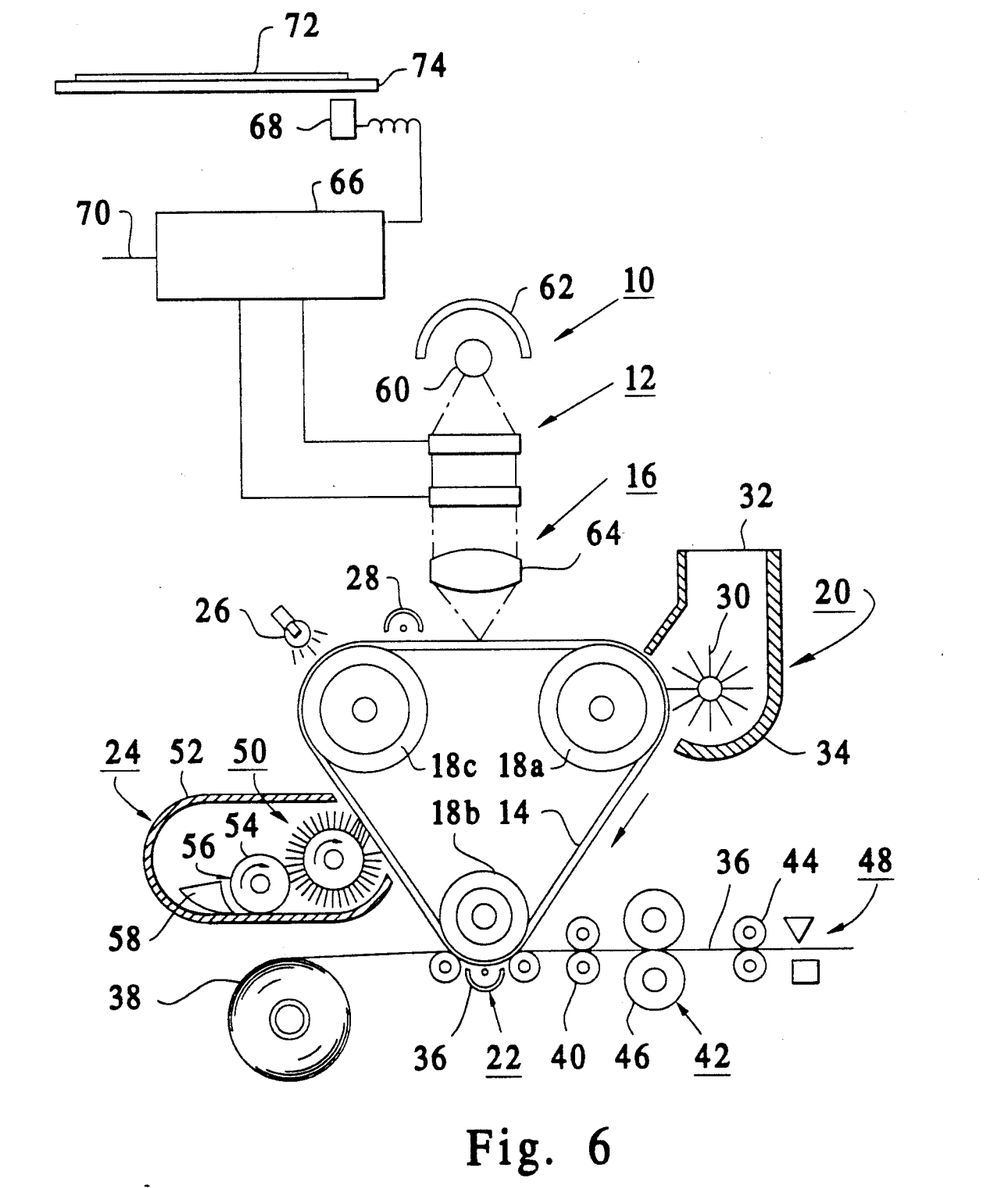
FIG. 6 is an elevational view of a system diagram of an electrophotographic printer incorporating a liquid crystal image bar which is usable with the present invention.

Referring to the system diagram of FIG. 6, there is shown an electrophotographic printer 10 utilizing a liquid crystal image bar 12. The printer 10 includes a series of process stations through which a photoconductive member 14 in the form of an endless belt passes.

Beginning with the imaging station 16 whereat the latent electrostatic image is formed, the photoconductive member 14 proceeds in the direction of the arrow around the guide rollers 18a, 18b, 18c past development station 20, transfer station 22, cleaning station 24, erase lamp 26 and precharging corona generating device 28 prior to returning to the imaging station. At development station 20, a rotating magnetic brush or paddle wheel 30, housed in hopper 32, presents toner particles 34 onto the surface of photoconductive member 14 as it moves around guide roller 18a. The toner particles 34 are charged with a polarity opposite the charges placed on the photoconductive member by the corona generating device 28 by means well known in the art by either triboelectric charging techniques or by a corona generating device (not shown) or both. The toner particles are attracted and held by the latent electrostatic image recorded on the photoconductive member at the imaging station, thus developing and rendering the latent image visible. The developed image is transferred to a permanent material 36 such as paper, at the transfer station 22. After the developed image is transferred, the photoconductive member proceeds past the cleaning station 24 where all residual toner particles are removed.

Paper is provided by supply roll 38 which is pulled through the transfer station via drive rolls 40 and through a toner particle fusing station 42 by drive rolls 44, where the developed image on the paper is permanently fixed thereto by means well known in the prior art, such as, by fusing rolls 46 which apply heat and pressure to the developed image. Cutter assembly 48 cuts the paper 36 with the fixed images into separate sheets as the paper moves into a collection tray or sorter (not shown). Subsequent to the developed image transfer, the photoconductive member 14 is moved past the cleaning station 24, which removes any residual toner particles not transferred to the paper. A soft rotating brush 50, housed in chamber 52, removes the residual toner from the photoconductive member 14 and a single conductive, electrically biased roll 54 is used to remove the toner particles from the brush 50. A conventional flicker bar (not shown) is arranged to assist in toner particle removal from the soft brush and a doctor blade 56 is used on the biased roll 54 to scrape the toner particles therefrom into a collecting tray 58, so that the toner particles collected may be reused if that is desired.

The imaging station comprises a light source 60 and reflector 62 which illuminates a liquid crystal image bar 12. It should also be noted that a small light source with a fiber optic array type optical coupler could be used. Light selectively passed through the image bar is focused by lens means 64 which may be one or more single lens, a Selfoc (Nippon Glass trademark) lens system, or a plurality of miniature lens associated with fiber optics. The image bar 12 selectively passes light to form latent electrostatic images one line at a time by erasing or discharging the image background areas on belt 14. The image bar is formed by a single row of dot shutters actuated by selective application of a voltage to the plurality of electrodes on one or both of the substrates of the image bar. It should be noted that there also may be multiple rows of staggered dot shutters. An electronic controller or microcomputer 66 energizes the appropriate electrode in response to digitized data from a scanning means such as a charge coupled device (CCD) linear image sensor 68 or digitized data from a source outside the printer 10, for example, from a character generator, computer or other means for storing and retrieving data via conductor 70. If a scanning CCD or a linear image sensor is used, it scans one line of information at a time from a stationary document 72 placed on a transparent, fixed platen 74. The CCD or image sensor scanning speed is substantially the same as the speed of the photoconductive member if real time imaging is to occur. Otherwise, a means for storing the document digitized data would have to be included in the electronic controller.

Figure 7:
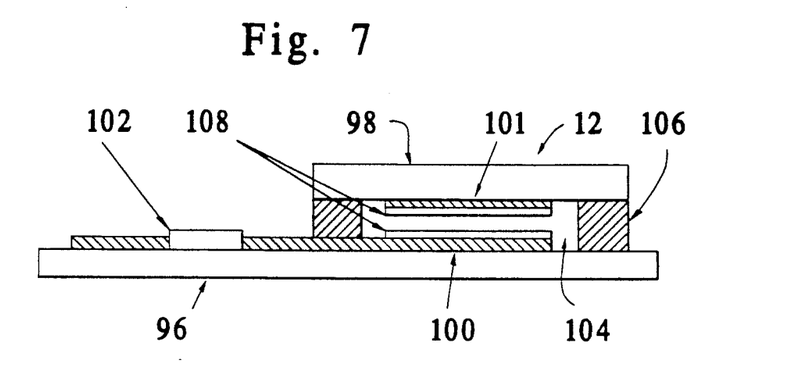
FIG. 7 is a cross-sectional view of a liquid crystal device according to the present invention.

FIG. 7 is a side cross-sectional view of image bar 12 constructed from a nematic liquid crystal material according to one embodiment of the present invention. While the presently discussed example utilizes a nematic liquid crystal material, it is understood that a ferroelectric liquid crystal material can also be used to form a liquid crystal device as well as an image bar for an image producing machine such as the machine illustrated in FIG. 6. Of course, different waveforms are supplied to the electrodes for the liquid crystal device depending upon whether it is constructed from a nematic material or a ferroelectric liquid crystal material. The first example to be described is for a nematic liquid crystal material where each liquid crystal device includes a pixel electrode addressed by a TFT.

Referring to FIG. 7, image bar 12 includes a first transparent substrate or plate 96 having at least one pixel electrode 100 formed on a surface thereof. Circuitry for applying a voltage to the pixel electrode 100 is typically provided on the same surface of first substrate 96 as pixel electrode 100. FIG. 7 illustrates only the TFT 102 of the control circuitry. A second substrate or plate 98 is provided and arranged substantially parallel to first substrate or plate 96. Second plate 98 includes at least one backplane electrode 101 thereon which opposes the one or more pixel electrodes 100 located on first plate 96. Second plate 98 can also be transparent. A liquid crystal material, which in this example is a nematic type liquid crystal material 104, is located between the first and second plates 96, 98 and in particular between the pixel and backplane electrodes 100, 101. The liquid crystal material 104 is sealed between the first and second plates 96, 98 by spacer 106. An alignment layer 108 is provided over each electrode 100, 101. The alignment layer in the present invention also serves as a DC current blocking layer, and is preferably made from poly-para-xylylene having a thickness sufficient to act as a DC blocking layer. Crossed polarizers which are used with liquid crystal devices are not shown in the figures, but are normally placed on surfaces of plates 96, 98 opposite from the surfaces thereof which contact the liquid crystal material 104. These crossed polarizers, as well as the general construction of image bars from liquid crystal devices is well known and disclosed in, for example, the above-incorporated U.S. Pat. No. 4,595,259 to Perregaux and U.S. Pat. No. 4,783,146 to Stephany et al.

One aspect of the present invention involves the use of parylene as an alignment layer in liquid crystal devices which has a thickness sufficient to block DC current flow through the liquid crystal. While parylene may have been used previously as an alignment layer, its use as a DC current blocking layer was previously unrecognized. Parylene is the generic name for members of a unique polymer series developed by Union Carbide Corporation. The basic member of the series, called parylene N, is poly-para-xylylene, a completely linear, highly crystalline material.

Parylene C, the second member of the series commercially available, is produced from the same monomer modified only by the substitution of a chlorine atom for one of the aromatic hydrogens. The structures are shown below:

Parylene N is a primary dielectric, exhibiting a very low dissipation factor, high dielectric strength and a dielectric constant invariant with frequency. Parylene N is known to be used as the dielectric in capacitors. Parylene C has a useful combination of electrical and physical properties plus a very low permeability to moisture and other corrosive gases. Along with its ability to provide a true pinhole-free conformal insulation, parylene C is the material of choice for coating of critical electronic assemblies.

Due to the uniqueness of the vapor phase deposition, the parylene polymers can be formed as structurally continuous films from as thin as a fraction of a micron to as thick as several mils. The deposition process for forming films of parylene is well known and thus will not be described any further here.

While poly-para-xylylene (parylene N) is preferred, other types of parylene can also be used. In the preferred embodiment, poly-para-xylylene layers having a thickness in the range from 500 Å to 2000 Å, preferably 500 Å are applied over the electrodes in a nematic-type liquid crystal device. A poly-para-xylylene layer having a thickness in the above range acts as a DC current blocking layer.

The inclusion of a DC blocking layer in a nematic-type liquid crystal device permits the strobe and data lines for the TFT's (also known as the Y-axis and X-axis address lines, respectively) to be addressed with voltages from two-level voltage drivers. However, as noted above with respect to FIGS. 5A-5B, the contrast achievable with liquid crystal devices employing a DC blocking layer is reduced if the liquid crystal device does not possess adequate leakage to fully discharge the blocking layer prior to the time at which a subsequent data signal is supplied to that liquid crystal device. That is, if the time frame between which consecutive image-wise modulated signals are applied to the liquid crystal is too small, the blocking layer will not be permitted to entirely discharge. Accordingly, in one aspect of the present invention, data is applied to the X-axis lines of the TFT on alternating frames so that the blocking layer is given adequate time to entirely discharge. Although it is possible to have the controller provide a line of blanks or logic zeros to the display, it is also possible to merely activate the inhibit line on each of the driver chips to save the computer the task of providing blank lines or logic zeros.

Figure 8A:
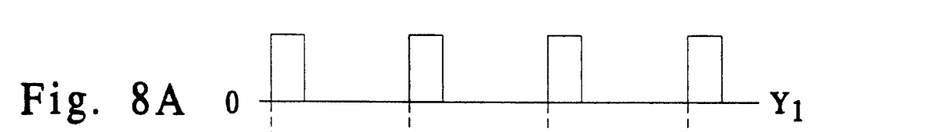
FIG. 8A illustrates the timing waveform applied during consecutive frames to the Y-axis of a TFT in a nematic liquid crystal device according to one embodiment of the invention.

FIGS. 8A–8D illustrate timing waveforms for nematic-type liquid crystal devices employing a DC current blocking layer. FIG. 8A illustrates the timing waveform to be applied to the strobe or Y-axis for strobe line $Y_1$ so as to selectively switch the TFT's for the group of pixel electrodes $100a$–$100d$ ON or OFF. A control means such as a microprocessor which controls two-level drivers 110 and 114 based upon an information signal from conductor 70, controls driver 110 so that each TFT is turned ON for a portion of each time frame. Additionally, controller 111 controls two-level driver 114 so as to provide data to each group of four TFT's while that group's strobe line (Y-axis line) is receiving a pulse so as to switch each TFT ON. For example, the appropriate data signals for electrodes $100a$–$100d$ is supplied to data lines $X_1$–$X_4$ while strobe line $Y_1$ turns each of TFT's $102a$–$102d$ ON. Depending on the state (light blocking or light transmitting) to which it is desired to place the liquid crystal material adjacent each pixel electrode, one of first and second voltage levels are supplied to the data lines. The first voltage level is below the threshold voltage (for example, the first voltage level can be zero potential), while the second voltage level provided by the TFT to the liquid crystal is above the threshold voltage potential of the nematic liquid crystal material. The voltage output by driver 114 to each TFT depends upon whether the pixel electrode 100 associated therewith is to be turned ON or turned OFF.

Figure 8B:
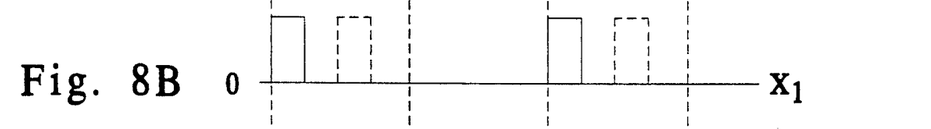
FIG. 8B illustrates the timing waveform applied to the X-axis of the TFT in the nematic liquid crystal device of FIG. 8A to turn that liquid crystal device "ON"
Figure 8C:
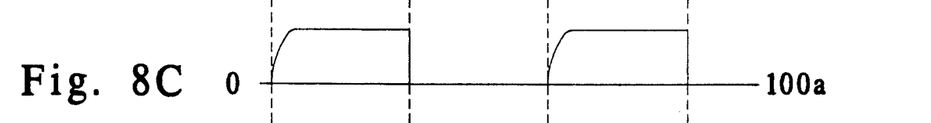
FIG. 8C illustrates the voltage on a pixel electrode (e.g., 100a) when the timing waveforms of FIGS. 8A and 8B are applied thereto.
Figure 8D:
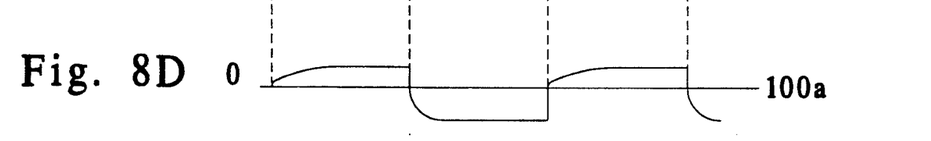
FIG. 8D illustrates the voltage applied across the nematic liquid crystal device associated with the pixel electrode when the voltage of FIG. 8C is applied thereto.

FIG. 8B illustrates the address scheme used when it is desired to turn a pixel (for example, a pixel associated with electrode $100a$) ON. Specifically, the second or positive voltage level is applied to the pixel electrode in a first frame and no voltage level (or at most a voltage below the threshold voltage potential) is applied to the TFT in the immediately subsequent frame when it is desired to turn that pixel ON. While no voltage (or voltage below the threshold voltage potential) is applied in the subsequent frame, the TFT nonetheless is switched ON so as to permit current to drain through the TFT during this frame. Thus, the blocking layer is permitted to entirely discharge in the subsequent frame as illustrated in FIGS. 8C and 8D. As in FIG. 2B, the pulse indicated by broken lines is for data line $X_1$ when strobe line $Y_3$ is being used to switch its associated TFT's ON. When it is desired to maintain a pixel in the OFF state, the first voltage level (which is below the threshold potential, e.g., zero potential) is applied to the X-axis, or data line of the TFT in both frames. Accordingly, each ON element is discharged to zero on alternate frames maintaining a large RMS value on the liquid crystal.

The above-described addressing scheme also eliminates the need for exclusive nor circuits in the driver chips for phase modulation, which means conventional vacuum-fluorescent driver chips may be used to drive the display. The only disadvantage of the above address scheme is that the drivers must drive the display to twice the peak-to-peak voltage than would otherwise be required. However, this is not an objection because vacuum fluorescent drivers have many times the voltage output necessary to drive the liquid crystal. For example, SUPERTEC HV4 and HV6 chips provide about 90 volts peak while only about 30 volts is necessary to drive the liquid crystal devices.

The above-described addressing scheme can be incorporated into devices such as displays which have more than one array of light shutters. Since a blank frame is interposed between actual frames of information, the liquid crystal is modulated with the data at a rate that is half the frame rate. Since the liquid crystal slightly follows the rate of modulation, it may be the case that this would cause a noticeable flicker to appear. Although this may be compensated for by increasing the frame rate, there is an alternative. In a display having a plurality of rows of light shutters, the odd numbered rows can be addressed on odd frames, while the even numbered rows are addressed on even frames. This would produce a reduced flicker in the total image output by the display without increasing the frame rate.

The use of a DC current blocking layer is also helpful in displays which utilize a ferroelectric liquid crystal material. As stated earlier, the use of a DC current blocking layer removes the necessity of applying complex and multi-level waveforms to the ferroelectric liquid crystal thereby permitting a simplified drive and increased speed of the ferroelectric liquid crystal display or print bar.

There are two methods for reducing or eliminating the DC component applied to the ferroelectric liquid crystal. Either an alignment layer such as the poly-para-xylylene material layer discussed above can be used to 10 eliminate the DC component of the applied voltage, or a ferroelectric liquid crystal material having a high dielectric constant can be used.

In the present invention, preferably a poly-para-xylylene layer having a thickness in the range from 500 Å to 2000 Å, preferably 1500 Å is used so as to block the DC component of the applied field. As stated earlier, since the parylene layer has a considerably smaller leakage resistivity than the ferroelectric liquid crystal material, the leakage resistance of the ferroelectric liquid crystal will transfer charge to the parylene layer since the parylene layer has capacitance and essentially no leakage.

Alternatively, a ferroelectric liquid crystal material having a high dielectric constant can be used. Such a ferroelectric liquid crystal material should have a dielectric constant of 25 or above. These liquid crystal materials are commercially available. Since the dielectric constant is high, the internal field in the ferroelectric liquid crystal is low and therefore the leakage current flowing within the ferroelectric liquid crystal material is low, although not zero. It has been found that it is not necessary to exactly reduce the DC component to zero to reduce deterioration to zero, provided that the liquid crystals do not have an affinity for water.

Regardless of how the DC component is blocked, the removal of the DC component permits two-level drivers to be used to supply voltages to the liquid crystal device pixels.

Figure 9:
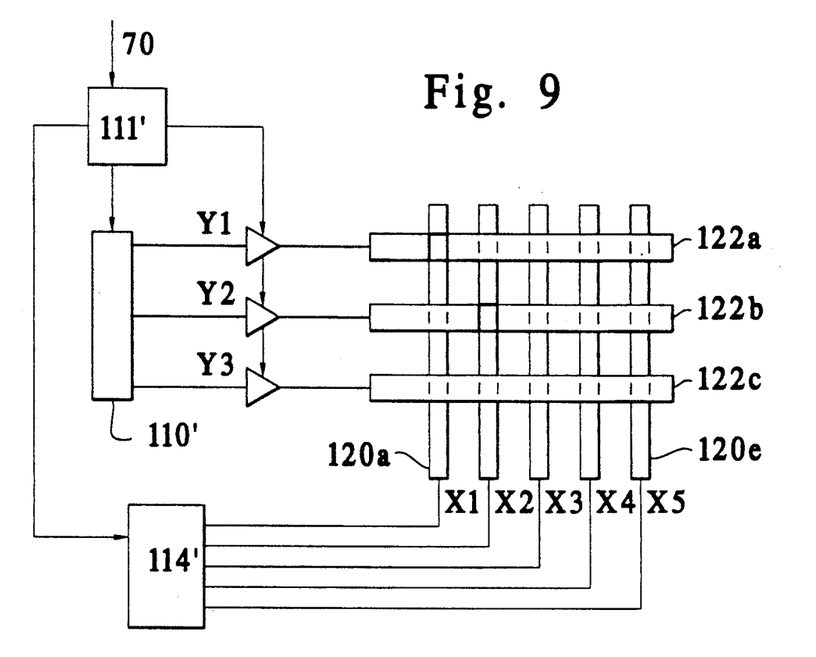
FIG. 9 is a plan view of a matrix of pixels for a ferroelectric liquid crystal.

FIG. 9 illustrates a preferred display wherein a matrix of pixels is formed. The matrix of pixels is formed by the intersections of two parallel arrays of electrodes 120a–e and 122a–c, the two arrays being arranged perpendicular to one another. As discussed above with respect to FIG. 7, two parallel plates are provided with a thin layer of ferroelectric liquid crystal material sealed therebetween. A plurality of parallel X-axis electrodes 120a–120e are located on the first plate so as to extend substantially across the liquid crystal material. A plurality of parallel Y-axis electrodes are located on the second plate and extend substantially across the liquid crystal material, but in a direction perpendicular to the X-axis electrodes. Thus, the intersections of the X-axis and Y-axis electrodes form the pixel elements which are selectively switched ON or OFF to permit light to pass therethrough, or to be blocked based upon an information signal containing data capable of forming an image. Since the DC component of the applied signals is blocked by the poly-para-xylylene layer (or the ferroelectric liquid crystal material itself if having the appropriate dielectric constant), pixels which share the same electrode (e.g., electrode 120a) are not partially switched ON due to the switching ON of a pixel on the same electrode. Thus, TFT's are not needed, reducing the costs of producing such ferroelectric liquid crystal devices.

A first voltage source 114' is connected to the X-axis electrodes 120a–120e via data lines $X_1$–$X_5$. The first voltage source 114' is controllable to selectively output a voltage having one of the potentials of $V_0$ and $-V_0$, where $V_0$ is the threshold voltage of the liquid crystal material. A second voltage source 110' is attached to the Y-axis electrodes 122a–122c via strobe lines $Y_1$–$Y_3$. The second voltage source 110' is controllable to selectively output a voltage having one of the potentials of $-nV_0$ and $2V_0$ wherein n is greater than 2, and preferably equal to 4 or 5. A controller such as controller 111' controls the state to which the pixels are switched (light blocking or light transmitting) based upon an information signal supplied from conductor 70. The pixels associated with each Y-axis electrode are addressed at the same time, one Y-axis electrode at a time. In other words, all of the pixels associated with electrode 122a are actuated, followed by the actuation of all of the pixels associated with electrode 122b, etc. Accordingly, each time frame (the time period in which all pixels are addressed) is divided into a number of dwell times, each Y-axis electrode being addressed within a single dwell time. In the example of FIG. 9, three dwell times are required to address all of the pixels (one dwell time for each Y-axis electrode 122a–122c). Thus, a time frame is equal to three dwell times in the FIG. 9 example. Additionally, it should be noted that while the pixels of FIG. 9 are illustrate as being in a matrix, it is possible to use the illustrated addressing scheme to supply actuating signals to a single array of pixels by placing each of the Y-axis electrode 122a–122c in a line and providing a larger number of X-axis electrodes with one X-axis electrode associated with each Y-axis electrode sharing the same address line from first voltage source 114'.

Figure 10:
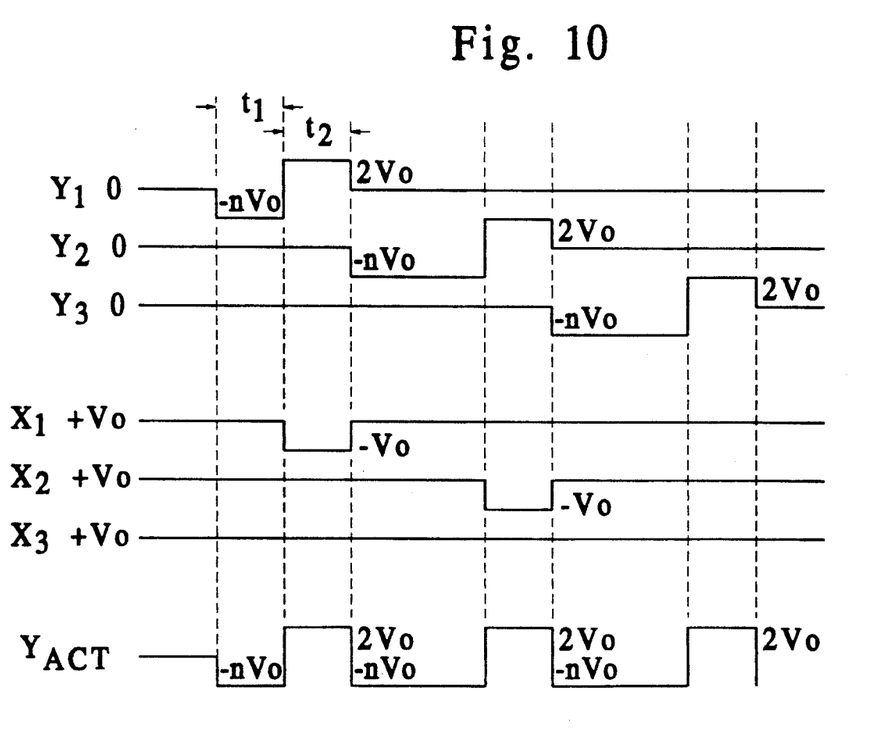
FIG. 10 illustrates the timing waveforms applied to the X and Y-axis electrodes of the ferroelectric liquid crystal display of FIG. 9 for the "ON" and "OFF" conditions of the liquid crystal devices in the display.

FIG. 10 shows the wave shapes to be applied. Control means 111' controls the first and second voltage sources 114' and 110' based on the information signal supplied from conductor 70 so as to apply voltage potentials across the ferroelectric liquid crystal material located between the X-axis and Y-axis electrodes through a series of consecutive frames (each frame comprising 3 dwell times) to selectively orient the ferroelectric liquid crystal material molecules in one of the first or second directions. The wave shape for a single frame is shown in FIG. 10. The control means 111' controls first voltage source 114' to output a voltage potential of $V_0$ for at least a first portion $t_1$ of each dwell time, and to selectively output either a voltage potential of $V_0$ for a remaining portion $t_2$ of a dwell time to orient the molecules in a first direction, or to output a voltage potential of $-V_0$ for the remaining portion $t_2$ of the dwell time to orient the molecules in the second direction. In the meantime, control means also controls the second voltage source 110' to output a voltage potential of $-nV_0$ during the first portion $t_1$ of each dwell time and to output a voltage potential of $2V_0$ during the remaining portion $t_2$ of each dwell time.

FIG. 10 illustrates wave shapes which would switch elements (1,1) and (2,2) on. These elements are shown shaded in FIG. 9. The interval for one dwell time (the time available to address one Y-axis electrode) is divided into two parts that are not equal, $t_1$ and $t_2$. Normally, $t_1$ would be shorter than $t_2$. During $t_1$, all data lines ($X_1$–$X_5$) are set to $V_0$, where $V_0$ is the threshold voltage for the ferroelectric liquid crystal material, at which value (or less) nothing happens in the ferroelectric liquid crystal material. A large pulse is applied to one of the strobe lines (first line $Y_1$) amounting to at least several times $V_0(-nV_0)$. The purpose of this pulse is to clear any information that might be stored in the bistable state of the ferroelectric liquid crystal material from the previous frame. The amplitude of this pulse may be made arbitrarily large since all X-axis drivers have the same voltage during $t_1$ and no interaction with the Y rows can possibly occur. Therefore, only the $Y_1$ row would be affected by the large pulse.

During time $t_2$, information is placed on the elements in the normal one-third address mode (described below). In this mode, $2V_0$ is placed on the addressed Y line and $-V_0$ is placed on the addressed X-lines for ON pixel elements, while $V_0$ is placed on the addressed X-lines for OFF pixel elements. This will result in a voltage of $3V_0$ on the ON elements and either $+V_0$ or $-V_0$ on all other elements (on all strobe lines). This is called the one-third address mode because the voltage applied to the liquid crystal is three times the threshold voltage. The wave shapes for turning on pixels and 2,2 are shown in FIG. 10.

Although three separate voltage levels are shown on each of the Y-axis waveforms, this does not require a three-level driver. Since only one Y-axis line need be switched on at one time, the two different ON voltages can be produced by varying the voltage applied to these lines in a stepwise fashion. In other words, the waveform of the Y power supply 110' is shown at the bottom of FIG. 10 and has only two voltage levels, $-nV_0$ and $2V_0$ each of which are applied to a single strobe line during its dwell time.

Two methods to either eliminate or reduce DC component on the pixels of a ferroelectric liquid crystal material have been described. Systems for addressing data to the ferroelectric liquid crystal material have been described which have a considerably higher effectiveness than in other systems. Since the interval $t_1$ can be made arbitrarily short by making the Y voltage arbitrarily large (by making the value of n arbitrarily large) during this period, the present invention makes very effective use of the access or dwell time. Because of this, data may be presented about 4 or 5 times faster than in some previous devices.

While the present invention is described with reference to a particular embodiment, this particular embodiment is intended to be illustrative, not limiting. Various modifications may be made without departing from the spirit and scope of the invention as defined in the appended claims.

What is claimed is:

1. Apparatus for projecting data on a photoreceptor surface comprising:

drive means for moving the photoreceptor surface;

a linear, optical writing station arranged transversely to the direction of travel of the photoreceptor surface including an array of liquid crystal devices mounted adjacent to the photoreceptor surface, said liquid crystal devices being arranged along at least one line, said array extending over a linear extent equivalent to the width of said photoreceptor surface onto which data is to be projected, each liquid crystal device having a pixel electrode covered with a DC blocking layer and located adjacent a nematic-type liquid crystal material, said nematic-type liquid crystal material including molecules which are oriented in a first direction when a voltage potential which is below a threshold voltage potential, is applied thereto and oriented in a second direction, different from said first direction, when a voltage potential which is above said threshold voltage potential, is applied thereto, said writing station further comprising:

a voltage source for selectively providing constant first and second voltage levels, said first voltage level being below said threshold voltage potential and said second voltage level being above said threshold voltage potential;

switching means, attached to each of said pixel electrodes, for selectively connecting each of said pixel electrodes to said voltage source; and control means for controlling said voltage source and said switching means so as to provide voltage potentials to each of said pixel electrodes through a series of consecutive time frames based on an information signal to selectively orient liquid crystal material molecules adjacent to each of said pixel electrodes in one of said first and second directions, said control means controlling said switching means to connect each of said pixel electrodes to said voltage source for a portion of each consecutive time frame, and controlling said voltage source to selectively provide one of said first and second voltage levels to each of said pixel electrodes when said switching means connects said pixel electrodes to said voltage source, wherein said control means controls said voltage source to supply said first voltage level to said pixel electrodes in two consecutive time frames to orient said molecules in said first direction, and to supply said second voltage level to said pixel electrodes in a first one of said two consecutive time frames and said first voltage level in a second one of said two consecutive time frames to orient said molecules in said second direction, whereby an unbalanced voltage having a root-mean-square value greater than zero is applied to each liquid crystal device.

2. The apparatus of claim 1, wherein said switching means is a plurality of thin film transistors each thin film transistor being attached to a corresponding pixel electrode, each thin film transistor having a strobe line connected to said control means and a data line connected to said voltage source.

3. The apparatus of claim 1, wherein said voltage source includes a vacuum-fluorescent driver chip.

4. The apparatus of claim 1, wherein said DC blocking layer is a layer of poly-paraxylylene having a thickness sufficient to act as a DC current blocking layer.

5. A liquid crystal display comprising:

a first transparent plate;

a second plate arranged substantially parallel to said first plate;

a nematic-type liquid crystal material sealed between said first and second plates;

a plurality of pixels defined in said liquid crystal material, said pixels being located in a series of rows and columns to form a matrix, said pixels defined by electrodes located on confronting, opposing surfaces of said first and second plates, said pixels being selectively actuatable between light transmitting and light blocking states based upon an information signal;

a layer of poly-paraxylylene having a thickness sufficient to act as a DC current blocking layer covering surfaces of said electrodes which confront and oppose each other; and nematic-type liquid crystal material including molecules which are oriented in a first direction when a voltage potential which is below a threshold voltage potential, is applied thereto and oriented in a second direction, different from said first direction, when a voltage potential which is above said threshold voltage potential, is applied thereto, and said electrodes which define said pixels including a plurality of pixel electrodes located on said first plate in said series of rows and columns to form said matrix, and at least one backplane electrode located on said second plate;

a voltage source for selectively providing constant first and second voltage levels, said first voltage level being below said threshold voltage potential and said second voltage level being above said threshold voltage potential;

switching means, attached to said of said pixel electrodes, for selectively connecting each of said pixel electrodes to said voltage source; and control means for controlling said voltage source and said switching means so as to provide voltage potentials to said pixel electrodes through a series of consecutive time frames based on an information signal to selectively orient liquid crystal material molecules adjacent said pixel electrodes in one of said first and second directions, said control means controlling said switching means to connect said pixel electrodes to said voltage source for a portion of each consecutive frame, and controlling said voltage source to selectively provide one of said first and second voltage levels to said pixel electrodes when said switching means connects said pixel electrodes to said voltage source, wherein said control means controls said voltage source to supply said first voltage level to said pixel electrodes in two consecutive time frames to orient said molecules in said first direction, and to supply said second voltage level to said pixel electrodes in a first one of said two consecutive time frames and said first voltage level in a second one of said two consecutive time frames to orient said molecules in said second direction, whereby an unbalanced voltage having a root-mean-square value greater than zero is applied to said pixels.

6. The device of claim 5, wherein said switching means is a plurality of thin film transistors attached to a corresponding pixel electrode, each thin film transistor having a strobe line connected to said control means and a data line connected to said voltage source.

7. The device of claim 5, wherein said voltage source includes a vacuum-fluorescent driver chip.

8. The display of claim 5, wherein said information signal is supplied to alternating rows of pixel electrodes at alternating frames.

9. A liquid crystal display comprising:
a first transparent plate;
a second plate arranged substantially parallel to said first plate;
a liquid crystal material sealed between said first and second plates;
a plurality of pixels defined in said liquid crystal material, said pixels being located in a series of rows and columns to form a matrix, said pixels defined by electrodes located on confronting, opposing surfaces of said first and second plates, said pixels being selectively actuatable between light transmitting said light blocking states based upon an information signal;
wherein surfaces of said electrodes which confront and oppose each other are coated with a layer of poly-para-xylylene having a thickness sufficient to act as a DC current blocking layer;
said liquid crystal material being a ferroelectric liquid crystal material having molecules which are stably oriented in a first direction when a voltage potential greater than $V_o$ is applied thereto and stably oriented in a second direction, different from said first direction, when a voltage potential less than $-V_o$ is applied thereto, and said electrodes which define said pixels including a plurality of parallel X-axis electrodes located on said first plate and extending substantially across said liquid crystal material, and a plurality of parallel Y-axis electrodes located on said second plate and extending substantially across said liquid crystal material in a direction perpendicular to said X-axis electrodes, said pixels being defined by intersections of said X-axis and Y-axis electrodes, said device further comprising:
a first voltage source attached to said X-axis electrodes, said first voltage source being controllable to selectively output a voltage having one of the potentials of $V_o$ and $-V_o$;
a second voltage source attached to said Y-axis electrodes, said second voltage source being controllable to selectively output a voltage having one of the potentials of $-nV_o$ and $2V_o$, wherein $n>2$; and
control means for controlling said first and second voltage sources based on said information signal so as to supply voltage potentials across said ferroelectric material located between said X-axis and Y-axis electrodes through a series of consecutive time frames to selectively orient said molecules in one of said first and second directions, each time frame having a plurality of consecutive dwell times, equal in number to said plurality of Y-axis electrodes, said control means controlling said second voltage source to output a voltage to each Y-axis electrode during a corresponding one of the plurality of dwell times so that each Y-axis electrode receives a voltage from said second voltage source for one dwell time each time frame;
said control means controlling said first voltage source to output said voltage potential of $V_o$ for at least a first portion of each dwell time, to selectively output one of said voltage potential of $V_o$ for a remaining portion of each dwell time to orient said molecules in said first direction, and to output said voltage potential of $-V_o$ for said remaining portion of each dwell time to orient said molecules in the second direction, the voltage output by said first voltage source during said remaining portion of each dwell time being based upon said information signal supplied to said control means, said control means also controlling said second voltage source to output said voltage potential of $-nV_o$ during said first portion of each dwell time and to output said voltage potential of $2V_o$ during said remaining portion of each dwell time.

10. The device of claim 9, wherein said information signal is supplied to alternating rows of pixel electrodes at alternating time frames.

11. Apparatus for projecting data on a photoreceptor surface comprising:
drive means for moving the photoreceptor surface,
a linear, optical writing station arranged transversely to the direction of travel of the photoreceptor surface including an array of liquid crystal devices mounted adjacent to the photoreceptor surface, said liquid crystal devices being arranged along at least one line, said array extending over a linear extent equivalent to the width of said photoreceptor surface onto which data is to be projected, each liquid crystal device having a pixel electrode located adjacent a ferroelectric liquid crystal material, at least one backplane electrode being located on a side of said liquid crystal material opposite from said pixel electrodes, said liquid crystal material including molecules which are stably oriented in a first direction when a voltage potential greater than $V_0$ is applied thereto and stably oriented in a second direction, different from said first direction, when a voltage potential less than $-V_0$ is applied thereto, said device further comprising:
a first voltage source attached to each of said pixel electrodes said first voltage source being controllable to selectively output a voltage having one of the potentials of $V_0$ and $-V_0$;
a second voltage source attached to said at least one backplane electrode, said second voltage source being controllable to selectively output a voltage having one of the potentials of $-nV_0$ and $2V_0$, wherein $n>2$; and
control means for controlling said first and second voltage sources based on an information signal so as to apply voltage potentials across said ferroelectric material located between said pixel and backplane electrodes through a series of dwell times to selectively orient said molecules in one of said first and second directions, said control means controlling said first voltage source to output said voltage potential of $V_0$ for at least a first portion of each dwell time, to selectively output one of said voltage potential of $V_0$ for a remaining portion of each dwell time to orient said molecules in said first direction, and to output said voltage potential of $-V_0$ for said remaining portion of each dwell time to orient said molecules in the second direction, the voltage output by said first voltage source during said remaining portion of each dwell time being based upon said information signal supplied to said control means, said control means controlling said second voltage source to output said voltage potential of $-nV_0$ during said first portion of each dwell time and to output said voltage potential of $2V_0$ during said remaining portion of each dwell time.

12. The apparatus of claim 11, wherein surfaces of each pixel electrode and said at least one backplane electrode are coated with a layer of poly-para-xylylene having a thickness sufficient to act as a DC current blocking layer.

13. The apparatus of claim 11, wherein surfaces of each pixel electrode are covered with a DC current blocking layer.

* * * * *